United States Patent
Kincaid

(10) Patent No.: US 10,781,333 B2
(45) Date of Patent: Sep. 22, 2020

(54) COATING ADHESION PROMOTORS AND METHODS OF USING THE SAME

(71) Applicant: AXALTA COATING SYSTEMS IP CO., LLC, Wilmington, DE (US)

(72) Inventor: Samuel J. Kincaid, Logan Township, NJ (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 15/673,885

(22) Filed: Aug. 10, 2017

(65) Prior Publication Data

US 2019/0048221 A1    Feb. 14, 2019

(51) Int. Cl.

| | | |
|---|---|---|
| *B05D 1/32* | (2006.01) | |
| *B05D 5/06* | (2006.01) | |
| *C09D 7/63* | (2018.01) | |
| *B05D 7/14* | (2006.01) | |
| *C09D 133/14* | (2006.01) | |
| *B05D 7/00* | (2006.01) | |
| *C09D 7/20* | (2018.01) | |

(Continued)

(52) U.S. Cl.
CPC ............ *C09D 133/14* (2013.01); *B05D 1/32* (2013.01); *B05D 1/325* (2013.01); *B05D 3/0486* (2013.01); *B05D 3/10* (2013.01); *B05D 5/06* (2013.01); *B05D 7/14* (2013.01); *B05D 7/544* (2013.01); *B05D 7/58* (2013.01); *C09D 7/20* (2018.01); *C09D 7/63* (2018.01); *B05D 5/005* (2013.01)

(58) Field of Classification Search
CPC .. C08F 255/023; C08F 255/02; C08F 255/00; C08L 51/06; C08L 2666/02; C09D 151/06; C09J 151/06
See application file for complete search history.

(56) References Cited

U.S. PATENT DOCUMENTS 4,933,237 A * 6/1990 Krenceski .............. B05D 1/286
156/229
5,466,286 A * 11/1995 Briselli ................ C09D 17/006
106/404
(Continued)

FOREIGN PATENT DOCUMENTS

DE   19635616 C1   9/1997
GB   2399040 A     9/2004

OTHER PUBLICATIONS

Bulldog® Adhesion Promoter Training, https://www.youtube.com/watch?v=sdQy_dfZM84, Posted on Mar. 8, 2013, Retrieved Jul. 1, 2019, video 1:59 length (Year: 2013).*

(Continued)

*Primary Examiner* — Francisco W Tschen
(74) *Attorney, Agent, or Firm* — Lorenz & Kopf, LLP

(57) ABSTRACT

Coating adhesion promotors and methods of coating a substrate are provided. In an exemplary embodiment, a method of coating a substrate includes applying an adhesion promotor over a primer, where the primer overlies the substrate. The adhesion promotor includes water. A first colored coat is applied over the adhesion promotor, and the first colored coat is flash dried. Tape is applied in a pattern over the first colored coat prior to the first colored coat fully curing. A second colored coat is applied over the first colored coat and over the tape, and the tape is removed from the first colored coat prior to the first colored coat fully curing.

9 Claims, 2 Drawing Sheets

(51) Int. Cl.
*B05D 3/04* (2006.01)
*B05D 3/10* (2006.01)
*B05D 5/00* (2006.01)

(56) References Cited

U.S. PATENT DOCUMENTS

| | | | |
|---|---|---|---|
| 5,942,072 | A | 8/1999 | McKinnon |
| 7,740,912 | B2* | 6/2010 | Uhlianuk ............... B05D 7/572 427/385.5 |
| 7,825,173 | B2 | 11/2010 | Willems et al. |
| 2006/0045965 | A1 | 3/2006 | Lin |
| 2007/0248830 | A1 | 10/2007 | Brier et al. |
| 2014/0329055 | A1 | 11/2014 | Berry et al. |
| 2015/0279512 | A1* | 10/2015 | Gallagher ................ C09D 7/63 427/58 |
| 2015/0376417 | A1* | 12/2015 | Dohner .................. C03C 17/30 106/287.11 |

OTHER PUBLICATIONS (Boss Painter, https://www.youtube.com/watch?v=dU2Pli2geZs, Posted May 17, 2015, Retrieved on Jul. 1, 2019, video 4:49 length (Year: 2015).*
http://kleanstripauto.com/products/bulldog/bulldog-waterborne-adhesion-promomoter, http://kleanstripauto.com/resources/product-resources/CPSIA-Compliance.Certificate_Bulldog%20Waterborne%20Adhesion%20Promoter_6.24.13.pdf Bulldog Waterborne Adhesion Promoter, Retrieved on Jul. 1, 2019 (Year: 2013).*
European Patent Office, International Search Report for International Application No. PCT/US2018/046355, dated Jan. 29, 2019, 10 pages.

* cited by examiner

COATING ADHESION PROMOTORS AND METHODS OF USING THE SAME

TECHNICAL FIELD

The technical field relates to adhesion promotors used in coatings, and more particularly relates to adhesion promotors for aqueous coatings where additional coating layers are added before an applied coating is fully cured.

BACKGROUND

Automobile repair or refinishing often involves applying a new exterior coating to the automobile. Various styles and designs are applied for aesthetic purposes, and in some examples the coating includes two or more colors (referred to herein as a "two-tone" coating.) The two-tone coating is typically applied using a first colored coat, followed by taping and masking to protect the area where the first colored coat is to remain as the exterior color. A second colored coat is then applied over the tape and masking, and over the exposed portion of the first colored coat. Additional colors may also be applied using the same techniques if the coating includes more than two colors. The tape and masking are removed after the final colored coat is applied, and a clear coat is optionally applied over all the colored coats.

The economics of automobile repair or refinishing favors rapid application of coatings, so allowing time for a complete cure of one coating layer before application of the next is undesirable. In some cases, the tape is applied to the first colored coat before the first colored coat has fully cured. In such cases, removal of the tape from the first colored coat often leaves a "tape print" on the first colored coat, where the "tape print" is a visible defect formed by the tape. In some examples, the tape print is an impression where the first colored coat has been deformed and "pressed out" of the area where the tape was located, but in other examples portions of the first colored coat will adhere to the tape and leave holes or gaps where the underlying material is visible.

Many refinishing coatings are water based to reduce emissions of volatile organic compounds (VOCs), and the time required for water to evaporate from the different coating layers depends on several factors such as temperature, ambient humidity, and air flow. The cure time is extended in some cases if the temperature, ambient humidity, or air flow are not at desired levels, and this may not be under the control of the refinishing operation. This extension of the cure time can further increase the time required for completion of a repair or refinishing operation.

Accordingly, it is desirable to provide coatings and methods that reduce or eliminate the tape print when tape is applied to a first colored coat before a complete cure. In addition, it is desirable to provide coatings and methods that reduce or eliminate the need to wait for a complete cure before application of subsequent coating layers. Furthermore, other desirable features and characteristics of the present invention will become apparent from the subsequent detailed description of the invention and the appended claims, taken in conjunction with the accompanying drawings and this background of the invention.

SUMMARY

Coating adhesion promotors and methods of coating a substrate are provided. In an exemplary embodiment, a method of coating a substrate includes applying an adhesion promotor over a primer, where the primer overlies the substrate. The adhesion promotor includes water. A first colored coat is applied over the adhesion promotor, and the first colored coat is flash dried. Tape is applied in a pattern over the first colored coat prior to the first colored coat fully curing. A second colored coat is applied over the first colored coat and over the tape, and the tape is removed from the first colored coat prior to the first colored coat fully curing.

A method of coating a substrate is provided in another embodiment. An adhesion promotor is applied over a primer, where the primer overlies a substrate external surface. The adhesion promotor includes water at a concentration of from about 60 to about 90 weight percent. The adhesion promotor also includes a first polymer at from about 7 to about 11 weight percent, where the first polymer includes a polyether modified acrylic resin. The polyether modified acrylic resin is formed from first polymer monomers that include oxypropylene glycol monomethacrylate, styrene, hydroxyethyl methacrylate, methylmethacrylate, and methacrylic acid. The adhesion promotor also includes a second polymer at from about 2 to about 7 weight percent, where the second polymer includes an acrylic latex formed from second polymer monomers. The second polymer monomers include allylmethacrylate, n-butylmethacrylate, methylmethacrylate, acrylic acid, and 2-hydroxyethyl methacrylate.

An adhesion promotor is provided in yet another embodiment. The adhesion promotor includes water at from about 60 to about 90 weight percent, and a first polymer at from about 7 to about 11 weight percent. The first polymer is a polyether modified acrylic resin that is formed from first polymer monomers that include oxypropylene glycol monomethacrylate, styrene, hydroxyethyl methacrylate, methylmethacrylate, and methacrylic acid. The adhesion promotor also includes a second polymer at from about 2 to about 7 weight percent, where the second polymer is an acrylic latex formed from second polymer monomers. The second polymer monomers include allylmethacrylate, n-butylmethacrylate, methylmethacrylate, acrylic acid, and 2-hydroxyethyl methacrylate. Other components of the adhesion promotor include: dipropylene glycol methyl ether at from about 13 to about 5 weight percent; n-pentanol at from about 1 to about 10 weight percent; a surfactant at from about 0.1 to about 1 weight percent; dimethyl ethanol amine at from about 0.1 to about 0.3 weight percent; a first thickener at from about 0.1 to about 0.5 weight percent; a second thickener at from about 0.2 to about 1 weight percent; propylene glycol methyl ether acetate at from about 0.5 to 3 weight percent; methyl ethyl ketone at from about 0.4 to about 6 weight percent; and an activator at from about 1.5 to about 7 weight percent.

BRIEF DESCRIPTION OF DRAWINGS

The present embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description. Embodiments of the present disclosure are generally directed to coatings, coating systems, and methods of using the same. In particular, this description focus on mid-coat adhesion promotors for aqueous based coating systems. The various tasks and process steps described herein may be incorporated into a more comprehensive procedure or process having additional steps or functionality not described in detail herein. In particular, various steps in the preparation and coating of substrates are well-known and so, in the interest of brevity, many conventional steps will only be mentioned briefly herein or will be omitted entirely without providing the well-known process details.

Figure 1:
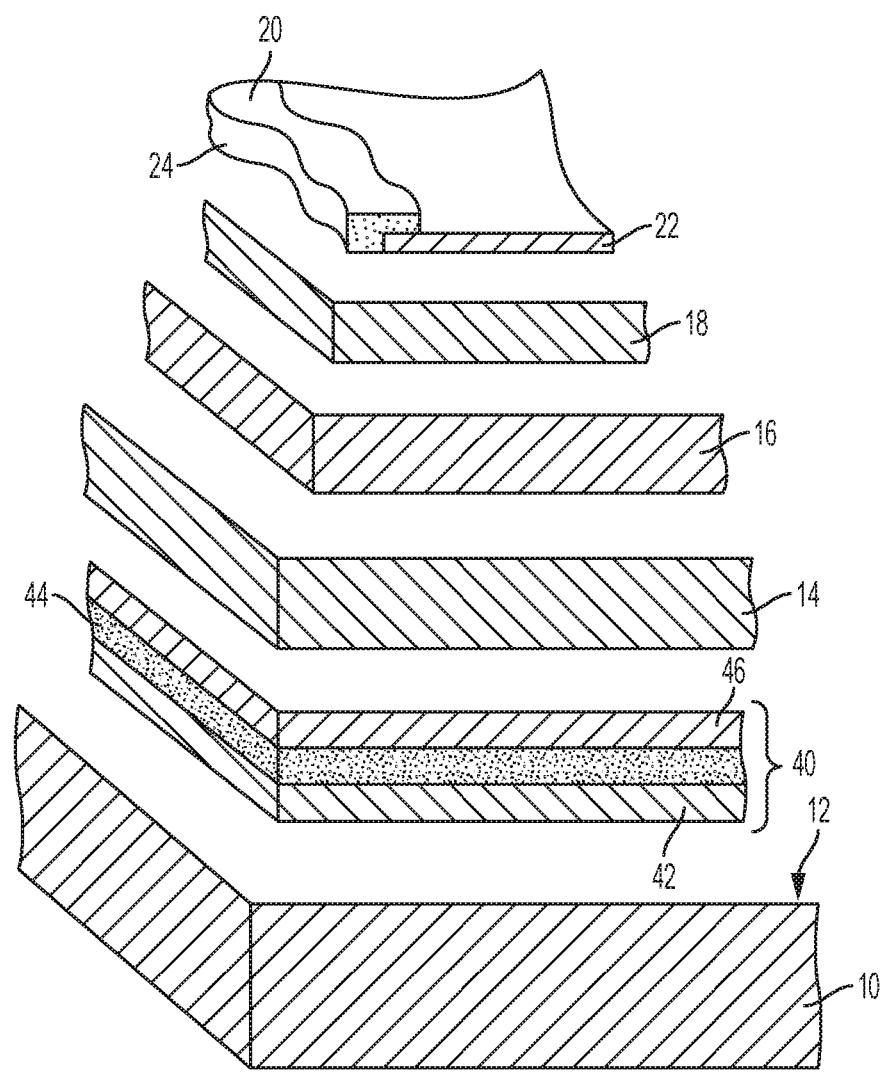
FIG. 1 is an exploded sectioned perspective view of an embodiment of a substrate with coatings.
Figure 2:
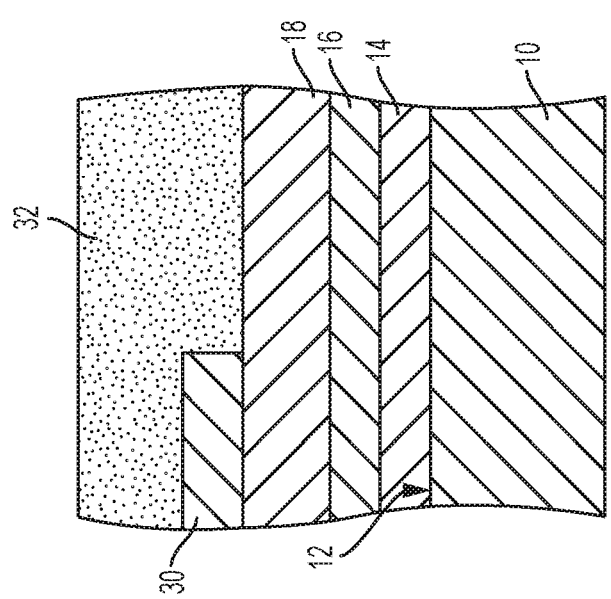
FIG. 2 is a side sectional view of an embodiment of a substrate with coatings and a portion of a tape.

Reference is made to an exemplary embodiment illustrated in FIGS. 1 and 2, where FIG. 1 is an exploded sectional perspective view and FIG. 2 is a side sectional view. A substrate 10 has a substrate external surface 12 that is coated with a primer 14. In an exemplary embodiment, the substrate 10 is a body of an automobile, but the substrate 10 may be a wall, a fence, a door, or almost any other object in alternate embodiments. The substrate 10 is metallic in some embodiments, such as a metallic automobile body component, but the substrate 10 is polymeric in alternate embodiments, such as a polymeric automobile moulding or body component. The substrate 10 may also be wood, glass, or other materials in alternate embodiments.

The primer 14 is a preparatory coating applied to the substrate 10 for superior adhesion of subsequent coating layers. In some embodiments, there are one or more additional layers (not illustrated) overlying the primer 14, such as one or more original equipment manufacturer (OEM) coatings 40. The OEM coating 40 may include one or more of an OEM primer 42, and OEM colored coat 44, and an OEM clear coat 46. As used herein, the term "overlying" means "over" such that an intervening layer may lie between the overlying layer or component (the primer 14 in this example) and the underlying layer or component (the substrate 10 in this example), or "on" such that the overlying layer or component physically contacts the underlying layer or component. Moreover, the term "overlying" means a vertical line passing through the upper component also passes through the lower component, such that at least a portion of the upper component is directly over at least a portion of the lower component. A "vertical" line is a line that is perpendicular to the substrate external surface 12. It is understood that the substrate 10 may be moved such that the relative "up" and "down" positions change, but a line that is perpendicular to the substrate external surface 12 provides a constant reference point. The primer 14 includes polymeric binders and may include other components as well, such as pigments or dyes, extenders, additives, or other compounds. As referred to herein, a "primer" 14 is a coating overlying the substrate external surface 12 that includes a polymeric binder.

An adhesion promotor 16 is applied overlying the primer 14, such that the primer 14 is positioned between the adhesion promotor 16 and the substrate 10. The adhesion promotor 16 may be applied to all areas of the substrate external surface 12 (and the overlying primer 14), but in some embodiments the adhesion promotor 16 is only applied to selected areas. For example, the adhesion promotor 16 may only be applied to areas where tape will be applied at a later stage, as described more fully below. To reduce the risk of the adhesion promotor 16 being visually distracting, the adhesion promotor 16 is free of a colorant in some embodiments. A colorant is a dye or a pigment, and "free" of a colorant, as used herein, means any colorant is present at a concentration of about 0.001 weight percent or less, based on the total weight of the adhesion promotor 16. The adhesion promotor 16 (and other layers described below) is applied with a spray gun in an exemplary embodiment, but the adhesion promotor 16 (and other layers described below) may be applied with a brush, a roller, dipping, or by other techniques in alternate embodiments.

In some embodiments, the adhesion promotor 16 is applied directly over the primer 14, but in alternate embodiments the adhesion promotor 16 is applied directly to the OEM coating 40, such as the most exterior layer of the OEM coating 40. When applied to the OEM coating 40, the adhesion promotor 16 still overlies the primer 14, but the OEM coating 40 is between the primer 14 and the adhesion promotor 16. In some embodiments, the primer 14 and the OEM primer 42 are the same thing. The OEM coating 40 may be cleaned and sanded prior to applying the adhesion promotor 16 to increase adhesion. However, in alternate embodiments, the OEM coating 40 is not present or the OEM coating 40 may be present in some locations but not in others on the same substrate 10, such as if the OEM coating 40 was removed from a damaged area of the substrate 10 but not from other areas of the substrate 10.

A first colored coat 18 is applied overlying the adhesion promotor 16, or at least overlying a portion of the adhesion promotor 16. The first colored coat 18 may be applied while the adhesion promotor 16 is still wet and has not fully flash dried. "Flash dried," as used herein, is defined as the point where about 85 weight percent of the solvent that was present during application has evaporated, where the solvent may be water or organic compounds in various embodiments, but at least about 10 weight percent of the solvent remains within the coating. Weight percentages of the solvent are based on the total weight of the solvent in the coating before application over the substrate 10. In other embodiments, the first colored coat 18 is applied after the adhesion promotor 16 has flash dried, but prior to a full cure of the adhesion promotor 16. A "full cure," as used herein, means about 95 percent of the solvent that was present during application has evaporated and any polymers present in the coating have reacted essentially to completion, where "reacting essentially to completion" means the polymerization reaction has proceeded to about 90 percent or more of the final reaction. It is understood that some of the monomers may not fully polymerize, so the "final reaction" is the level of reaction about 1 year after the coating is applied to the substrate 10. The adhesion promotor 16, and other coatings described herein, flash dries before fully curing. In yet other embodiments, the first colored coat 18 is applied to the adhesion promotor after the adhesion promotor has fully cured.

The adhesion promotor 16 includes a first polymer with a low glass transition temperature and a low average molecular weight, and the adhesion promotor 16 includes a second polymer with a high glass transition temperature and a high average molecular weight. The low glass transition temperature and low average molecular weight are less than the high glass transition temperature and the high average molecular weight, respectively. In an exemplary embodiment, the low molecular weight of the first polymer has a peak average molecular weight of less than about 100,000 Daltons, and the high molecular weight of the second polymer has a peak average molecular weight of more than about 500,000 Daltons, where a peak average molecular weight is the molecular weight at the peak of the molecular weight curve.

The first polymer may tend to improve adhesion to the primer 14, and the second polymer may increase the hardness of the adhesion promotor 16 to reduce or eliminate tape print. The combination of at least two different polymers, including the first and second polymers, provides separate beneficial properties for the adhesion promotor 16.

In an exemplary embodiment, the first polymer is a polyether modified acrylic resin formed from first polymer monomers, wherein the first polymer monomers comprise from about 40 to about 55 weight percent oxypropylene glycol monomethacrylate, from about 15 to about 25 weight percent styrene, from about 10 to about 20 weight percent hydroxyethyl methacrylate, from about 10 to about 20 weight percent methylmethacrylate, and from about 1 to about 10 weight percent methacrylic acid, based on the total weight of the first polymer. In some embodiments, the first polymer monomers listed above are the only monomers in the first polymer.

In some embodiments, the second polymer is an acrylic latex formed from second polymer monomers, where the second polymer monomers comprise from about 0.1 to about 5 weight percent allylmethacrylate, from about 50 to about 60 weight percent n-butylmethacrylate, from about 35 to about 50 weight percent methylmethacrylate, from about 0.5 to about 3 weight percent acrylic acid, and from about 0.5 to about 3 weight percent 2-hydroxyethyl methacrylate, based on the total weight of the second polymer. In some embodiments, the second polymer monomers are the only monomers in the second polymer.

The adhesion promotor 16 includes an activator that is added shortly before application of the adhesion promotor 16 overlying the substrate 10. The activator is configured to crosslink one or both of the first and second polymers to facilitate curing and a more durable coating. The activator includes a polyisocyanate in an exemplary embodiment, and the polyisocyanate is a water dispersible resin in some embodiments, but activator includes other active ingredients in alternate embodiments. The adhesion promotor 16 is an aqueous based coating, so water dispersability of the polyisocyanate increases mixing and effectiveness. The activator may be configured to react and cross-link other polymers in embodiments where the adhesion promotor 16 includes additional polymers. In an exemplary embodiment, the activator begins cross-linking the first and second polymers when incorporated into the adhesion promotor 16, and the adhesion promotor 16 is applied within a working time after the activator is incorporated into the adhesion promotor 16 to minimize curing within the spray gun or other application device. The working time may be about 1 hour, or about 2 hours, or about 4 hours, or other time periods in various embodiments. The working time can be varied by selection of the activator active ingredient, the concentration of the activator, the temperature, or other parameters.

In an exemplary embodiment, the activator includes from about 10 to about 50 weight percent solvent, and from about 50 to about 90 weight percent polyisocyanate resin, based on the total weight of the activator. A solvent that dissolves the polyisocyanate resin is used, such as propylene glycol methyl ether acetate, but other solvents can be used in alternate embodiments. The activator may include other additives in some embodiments, such as surfactants.

A hydrophobic solvent may be present in the adhesion promotor 16, where the hydrophobic solvent may help minimize or eliminate stress cracking. N-pentanol is used as the hydrophobic solvent in some embodiments, but other solvents are used in alternate embodiments. One or more thickeners may also be included in the adhesion promotor 16. In an exemplary embodiment, the adhesion promotor 16 includes a HASE (hydrophobically modified alkali-swellable emulsion) thickener and a HEUR (hydrophobically modified, ethoxylated urethane resin) thickener. In one embodiment, the HASE thickener is a polymer formed from first thickener monomers, wherein the first thickener monomers comprise acrylic acid, methacrylic esters, and hydrophobic ester monomers, and the HEUR thickener is hydrophobically modified ethylene oxide-based urethane block copolymer. The thickeners may help provide a smooth surface of the adhesion promotor 16 such that overlying coats, described below, have acceptable texture and appearance.

The adhesion promotor 16 is an aqueous coating in some embodiments, so water is present as a solvent. A coalescing solvent is also present in some embodiments, where the coalescing solvent may help with wetting of the adhesion promotor 16 when applied, and with fusing of the first and second polymers and the activator. Exemplary coalescing solvents include n-pentanol or glycol ether, but other coalescing solvents may be used in alternate embodiments. A surfactant is optionally present in some embodiments to facilitate wetting of the adhesion promotor 16 during application. An exemplary surfactant is ethoxylated-2,5,8,11-tetramethyl-6-dodecyne-5,8-diol, but other surfactants are used in alternate embodiments.

The concentration of the various components of the adhesion promotor 16 vary in different embodiments. In an exemplary embodiment, the adhesion promotor 16 includes (all weight percents based on the total weight of the adhesion promotor 16, where the weight percents are for the listed ingredient without carrier solvents or additives): water at a concentration of from about 60 weight percent to about 90 weight percent; the first polymer at from about 7 to about 11 weight percent (based on the 100% polymer, or the polymer in solid form); the second polymer at from about 2 to about 7 weight percent (based on the 100% polymer, or the polymer in solid form); dipropylene glycol methyl ether from about 1 to about 5 weight percent; n-pentanol at from about 1 to about 10 weight percent; the surfactant at from about 0.1 to about 1 weight percent; dimethyl ethanol amine at from about 0.1 to about 0.3 weight percent; a first thickener that is a HASE thickener at from about 0.1 to about 0.5 weight percent; a second thickener that is the HEUR thickener at from about 0.2 to about 1 weight percent; an activator at from about 1.5 to about 7 weight percent; propylene glycol methyl ether acetate at from about 0.5 to about 3 weight percent; and methyl ethyl ketone at from about 0.4 to about 6 weight percent. The HASE thickener is different than the HEUR thickener.

A first colored coat 18 is applied overlying the adhesion promotor 16. The first colored coat 18 is applied prior to the adhesion promotor 16 flash drying in some embodiments, but the first colored coat 18 is applied after the adhesion promotor 16 has flash dried but has not fully cured in other embodiments, as mentioned above. Also, as mentioned above, the first colored coat 18 can be applied after the adhesion promotor 16 has fully cured. The first colored coat 18 includes a polymeric binder, and the first colored coat 18 is an aqueous coating as applied. Therefore, the first colored coat 18 includes from about 30 to about 80 weight percent water as applied, based on the total weight of the first colored coat 18. In an exemplary embodiment, the polymeric binder of the first colored coat 18 includes one or more of an acrylic latex, a polyurethane, and/or a polyester. The first colored coat 18 typically includes a colorant, and may include a variety of additives such as surfactants, thickeners, etc.

After the first colored coat 18 is applied, a tape 20 and optionally a cover 22 are applied overlying a portion of the first colored coat 18. The cover 22 may be a cellulosic material, such as paper, or a polymeric material, such as plastic sheeting, or a wide variety of other materials in various embodiments. The tape 20 and cover 22 are applied in a pattern 24, where the tape 20 and cover 22 are positioned to protect a portion of the first colored coat 18 from being covered by additional colored coats. This technique is used to produce a two-tone coating for the substrate 10. The tape 20 and optional cover 22 are applied overlying the first colored coat 18 prior to the first colored coat fully curing in an exemplary embodiment, but after the first colored coat 18 flash dries.

A second color coat 30 is applied overlying and contacting the exposed portions of the first color coat 18 as well as the tape 20 and the optional cover 22. With the exception of the colorant, the second color coat 30 is the same as the first color coat 18 in an exemplary embodiment, but in other embodiments the first and second color coats 18, 30 have different compositions.

Figure 3:
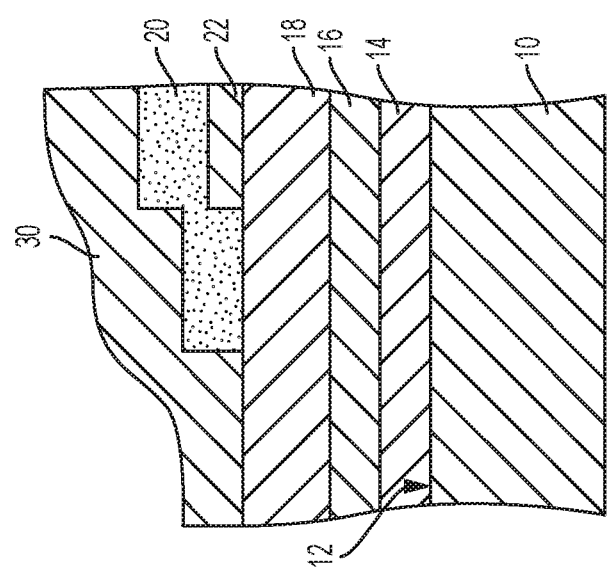
FIG. 3 is a side sectional view of an embodiment of a substrate after removal of the tape and application of a clear coat.

Referring to FIG. 3 with continuing reference to FIGS. 1 and 2, the tape 20 and optional cover 22 are removed before the second color coat 30 fully cures. In some embodiments, the tape 20 and optional cover 22 are removed before the second color coat 30 flash dries. The portion of the second color coat 30 that overlies the tape 20 and optional cover 22 are removed with the tape 20 and optional cover 22. In this manner, the pattern 24 formed by the tape 20 and optional cover 22 is transferred to the substrate 10 because the exposed portions of the first color coat 18 are covered with the second color coat 30 that has a different color than that of the first color coat 18, and the covered portions of the first color coat 18 are visible upon removal of the tape 20 and cover 22. The tape 20 and cover 22 may be removed after the second color coat 30 fully cures, but the removal process may be more difficult. An optional clear coat 32 is applied overlying the first and second color coats 18, 30 in some embodiments. The clear coat 32 includes a polymeric binder, and is free of a colorant in some embodiments.

The tape 20 is removed from the first colored coat 18 before the first colored coat 18 fully cures in some embodiments, and the first colored coat 18 is free of a tape print. The adhesion promotor 16 adheres to the first colored coat 18 such that the first colored coat 18 remains attached to the adhesion promotor 16 instead of the tape 20 during the tape removal process. The adhesion promotor 16 is only applied to general areas where the tape 20 is applied in some embodiments, so the required amount of adhesion promotor 16 may be kept to a minimum. The ability to apply the tape 20, the second colored coat 30, and then remove the tape 20 before the first colored coat 18 fully cures speeds the refinishing job significantly. The reduced time to complete the refinishing job increases throughput and efficiency for the refinisher.

Example

An adhesion promotor was prepared according to the table 1, below, where several components are added as solution and where the weights listed below include carrier solvents:

TABLE 1

| Ingredient | Weight, in grams |
|---|---|
| DI Water | 120.7 |
| Polymer 1 | 62.4 |
| Polymer 2 | 25.6 |
| Dipropylene glycol methyl ether | 2.4 |
| n-Pentanol | 8.3 |
| Surfactant | 1.2 |
| HASE thickener | 7.1 |
| Dimethyl ethanol amine | 3.6 |
| HEUR thickener | 5.9 |
| Activator | 11.9 |
| | 249.1 |

The adhesion promotor was applied to a panel and allowed to flash dry. Two coats of a first colored coat were applied wet on wet, and flash dried for 30 minutes. Purple 471+ vinyl tape was applied to the first colored coat and pressed down. The tape was pressed down a second time after a 5 minute wait. The tape was left in place for 30 to 60 minutes, and then removed with a fast pull technique. The first colored coat remained on the panel and there was no visible tape print.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:
1. A method of coating a substrate comprising:
applying an adhesion promotor overlying a primer, wherein the primer overlies the substrate, wherein the adhesion promotor comprises water, wherein the adhesion promotor comprises a first polymer at from about 7 to about 11 weight percent, based on a total weight of the adhesion promotor, and wherein the first polymer comprises a polyether modified acrylic resin formed from first polymer monomers, wherein the first polymer monomers comprise from about 40 to about 55 weight percent oxypropylene glycol monomethacrylate, from about 15 to about 25 weight percent styrene, from about 10 to about 20 weight percent hydroxyethyl methacrylate, from about 10 to about 20 weight percent methylmethacrylate, and from about 1 to about 10 weight percent methacrylic acid, where the weight percent of the first polymer monomers is based on a total weight of the first polymer;
applying a first colored coat overlying the adhesion promotor;
flash drying the first colored coat, wherein the first colored coat flash dries prior to fully curing;
applying tape overlying the first colored coat prior to the first colored coat fully curing, wherein the tape is applied in a pattern over part of the first colored coat;
applying a second colored coat overlying the first colored coat and overlying the tape; and removing the tape from the first colored coat prior to the first colored coat fully curing.

2. The method of claim 1 wherein applying the first colored coat comprises applying the first colored coat prior to the adhesion promotor fully curing.

3. The method of claim 1 wherein applying the first colored coat comprises applying the first colored coat prior to the adhesion promotor flash drying, wherein the adhesion promotor flash dries when about 85% of the water originally present in the adhesion promotor has evaporated.

4. The method of claim 1 further comprising:
incorporating an activator into the adhesion promotor before applying the adhesion promotor.

5. The method of claim 1 wherein applying the adhesion promotor comprises applying the adhesion promotor wherein the adhesion promotor comprises water at a concentration of from about 60 weight percent to about 90 weight percent, based on a total weight of the adhesion promotor.

6. The method of claim 1 wherein applying the adhesion promotor comprises applying the adhesion promotor wherein the adhesion promotor comprises a first thickener at from about 0.1 to about 0.5 weight percent, based on a total weight of the adhesion promotor, wherein the first thickener comprises a polymer formed from first thickener monomers, wherein the first thickener monomers comprise acrylic acid, methacrylic esters, and hydrophobic ester monomers.

7. The method of claim 6 wherein applying the adhesion promotor comprises applying the adhesion promotor wherein the adhesion promotor comprises a second thickener at from about 0.2 to about 1 weight percent, based on the total weight of the adhesion promotor, wherein the second thickener comprises hydrophobically modified ethylene oxide-based Urethane block copolymer.

8. The method of claim 1 wherein applying the adhesion promotor comprises applying the adhesion promotor wherein the adhesion promotor comprises:
dipropylene glycol methyl ether from about 1 to about 5 weight percent;
n-pentanol from about 1 to about 10 weight percent; and
a surfactant at from about 0.1 to about 1 weight percent.

9. The method of claim 1 wherein applying the adhesion promotor comprises:
applying the adhesion promotor overlying an OEM coating, wherein the OEM coating overlies the primer.

* * * * *